United States Patent [19]

Fukumura et al.

[11] Patent Number: 4,921,227
[45] Date of Patent: May 1, 1990

[54] CAR SUSPENSION SYSTEM

[75] Inventors: Takeo Fukumura, Yokohama; Takeyoshi Shinbori, Yokosuka; Nobuya Ezure, Zama, all of Japan

[73] Assignee: NHK Spring Co., Ltd., Yokohama, Japan

[21] Appl. No.: 297,572

[22] Filed: Jan. 13, 1989

Related U.S. Application Data

[62] Division of Ser. No. 5,556, Jan. 20, 1987, Pat. No. 4,828,231.

[30] Foreign Application Priority Data

Jan. 30, 1986 [JP] Japan ................................. 61-16743
Jun. 13, 1986 [JP] Japan ................................. 61-90451

[51] Int. Cl.$^5$ .............................................. F16F 9/04
[52] U.S. Cl. ................................ 267/64.23; 188/314; 267/64.27; 267/64.28; 267/122
[58] Field of Search ........... 188/314, 315, 318, 322.21, 188/299; 267/64.13, 64.19, 64.23, 64.27, 64.28, 122, 123; 280/702

[56] References Cited

U.S. PATENT DOCUMENTS

| | | |
|---|---|---|
| 3,140,085 | 7/1964 | De Carbon . |
| 3,380,729 | 4/1968 | Hoffmann et al. . |
| 3,788,433 | 1/1974 | Katsumori . |
| 4,103,492 | 8/1978 | Sakazume ................ 267/64.28 X |
| 4,153,237 | 5/1979 | Supalla ...................... 188/314 X |
| 4,159,756 | 7/1979 | Murakami et al. . |
| 4,270,771 | 6/1981 | Fujii . |
| 4,311,302 | 1/1982 | Heyer et al. ................ 188/314 X |
| 4,614,255 | 9/1986 | Monta et al. ............. 267/64.23 X |

FOREIGN PATENT DOCUMENTS

| | | |
|---|---|---|
| 1179122 | 10/1964 | Fed. Rep. of Germany ... 267/64.23 |
| 2314718 | 3/1974 | Fed. Rep. of Germany . |
| 38-13561 | 1/1974 | Japan . |
| 20966 | 2/1980 | Japan . |
| 56-80540 | 7/1981 | Japan . |
| 56-131409 | 10/1981 | Japan . |
| 56-149203 | 11/1981 | Japan . |
| 59-5447 | 2/1984 | Japan . |
| 996768 | 2/1983 | U.S.S.R. . |
| 398766 | 9/1933 | United Kingdom . |
| 478591 | 6/1938 | United Kingdom . |
| 870657 | 6/1961 | United Kingdom . |
| 1239627 | 7/1971 | United Kingdom . |

Primary Examiner—Andres Kashnikow
Attorney, Agent, or Firm—Frishauf, Holtz, Goodman & Woodward

[57] ABSTRACT

A hydro-pneumatic suspension system used in a vehicle, includes a cylindrical, hollow main housing having opposite first and second ends, with an oil chamber in the interior thereof; a rod axially slidable in the main housing through the first end and having an outer end portion located outside of the main housing; a cylindrical, hollow sub housing having opposite open and closed ends; a connecting passage connecting the main housing oil chamber with the open end of the sub housing, and being connected between the second end of the main housing and the open end of the sub housing; a metal bellows arranged coaxially within the sub housing so as to expand and contract axially therein, and having a closed free end and an open end sealed to the open end of the sub housing; a second oil chamber defined by an inner wall of the metal bellows, and communicating with the main housing oil chamber through the connecting passage; a damping device disposed within the sub housing and including an orifice which connects the oil chambers of the main and sub housings; a gas chamber defined by an outer wall of the bellows and an inner wall of the sub housing, and containing a high-pressure compressed gas which is sealed therein for providing a spring force; and a gas spring constant-adjusting liquid contained in the gas chamber.

8 Claims, 6 Drawing Sheets

CAR SUSPENSION SYSTEM

This is a division of application Ser. No, 07/005,556 filed Jan. 20, 1987, now U.S. Pat. No. 4,828,231.

BACKGROUND OF THE INVENTION

The present invention relates to a suspension system adapted to be arranged between members on the body side and wheel side of an automobile, and more specifically, to an improvement of a suspension system having an oil chamber and a gas chamber therein.

A prior art suspension system of an oil-gas pressure type comprises a cylinder housing with a rod fitted therein. A gas chamber and an oil chamber are defined inside the cylinder housing. A high-pressure gas, such as nitrogen, is sealed in the gas chamber Utilizing the repulsive force of the gas, the system serves as a gas spring. Damping force-generating means is provided inside the cylinder housing. As the oil in the oil chamber passes through the generating means, a damping force is produced by the viscous resistance of the oil, and is used to damp reciprocation of the rod.

Conventionally, a free piston is disposed between oil and gas, in order to prevent the gas in the gas chamber from being absorbed into the oil in the oil chamber. In a suspension system disclosed in U.S. Pat. No. 4,159,756, for example, a seal is provided on the outer peripheral surface of a free piston.

In suspension systems using a free piston, however, considerable frictional resistance occurs at the seal portion, as the piston moves. Moreover, the gas is liable to leak out through the seal portion of the piston, so that it is thus difficult to completely prevent the gas from being absorbed into the oil.

An arrangement has been proposed such that the gas and oil chambers are divided by means of a plastic partition member. However, the plastic member cannot satisfactorily prevent gas permeation. Therefore, prolonged use of the suspension system may possibly cause a gas leak, thereby reducing the capacity of the gas chamber. If the gas chamber capacity lessens in this manner, the spring constant of the system increases. As a result, the car becomes less comfortable to ride in, and its ride height is lowered. Thus, a large gas leak makes it hard to maintain the original performance of the suspension system. To cope with this, gas must be resupplied or resealed into the gas chamber inside the cylinder housing. Resupply of gas, however, entails much trouble.

SUMMARY OF THE INVENTION

Accordingly, an object of the present invention is to provide a car suspension system, in which gas confined in a gas chamber, inside the system, can be securely prevented from being absorbed into oil in an oil chamber. Another object of the invention is to provide a suspension system wherein a substantial a free piston, never occurs.

In order to achieve the above objects, a car suspension system according to the present invention comprises a cylinder assembly including at least one cylinder housing and a rod, the rod being fitted in the cylinder housing and movable in the axial direction of the cylinder housing, the cylinder assembly further including an oil chamber for containing oil and a gas chamber for containing gas; damping force-generating means disposed inside the cylinder assembly, and adapted to damp reciprocation of the rod by utilizing viscous resistance, produced when the oil in the cylinder assembly is circulated; and a metal bellows located between the oil chamber and the gas chamber, so as to be coaxial with the cylinder housing, the bellows being formed of a thin metal plate, having a sealed internal space, dividing the oil and gas chambers, and being capable of extending and contracting in the axial direction of the cylinder housing.

In the suspension system constructed in this manner, if the rod moves in its contracting direction, relative to the cylinder housing, gas in the cylinder assembly is compressed. As a result, the capacity of the gas chamber is reduced, so that the gas contained therein increases in its repulsive force. If the rod moves in its extending direction, on the other hand, the capacity of the gas chamber increases, so that the repulsive force of the gas therein weakens.

Thus, as the cylinder housing and the rod reciprocate relatively in the axial direction, the capacity of the gas chamber varies, so that the metal bellows extends and contracts. The oil and gas chambers are completely isolated from each other. Accordingly, the gas in the gas chamber can be securely prevented from being absorbed into the oil in the oil chamber. Without the need to replenish the gas chamber, therefore, the spring characteristics and the ride comfort of the car can be kept constant for a long time. By extending and contracting with the variation of the capacity of the gas chamber, moreover, the bellows never produces such a substantial frictional resistance as is caused by the movement of a free piston.

DETAILED DESCRIPTION OF THE PREFERRED EMBODIMENTS

Figure 1:
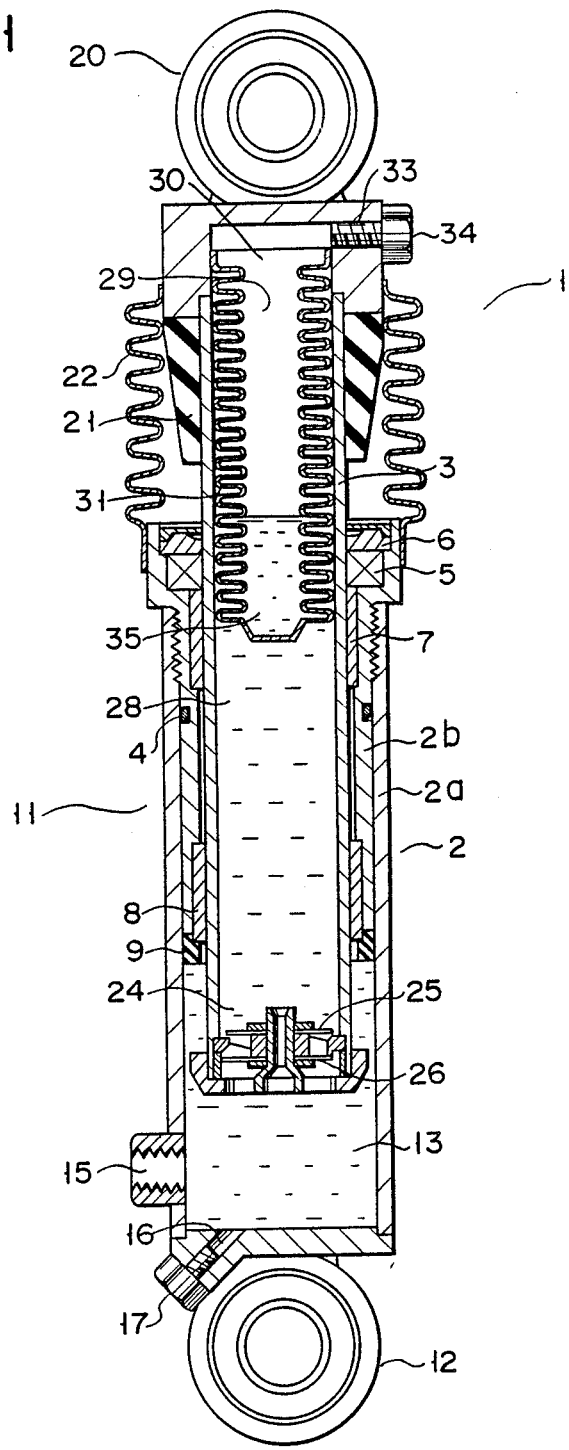
FIG. 1 is a longitudinal sectional view of a suspension system according to a first embodiment of the present invention.

FIG. 1 shows a first embodiment of the present invention. As is shown in FIG. 1, car suspension system 1 comprises cylinder housing 2 with rod 3 fitted therein. Rod 3, having the shape of a hollow cylinder, can reciprocate along the axis of housing 2.

Cylinder housing 2 includes cylindrical first member 2a with cylindrical second member 2b fitted therein. Mechanical seal 5, seal retainer 6, and sliding bearing 7 are attached to the upper end portion of second member 2b. Sliding bearing 8 and rebound rubber 9 are attached to the lower end portion of second member 2b. Housing 2 and rod 3 constitute cylinder assembly 11.

Coupling member 12 is mounted on the lower end of cylinder housing 2. Housing 2 is connected to a member (not shown) on the wheel side, by means of the coupling member. Oil chamber 13 is defined inside housing 2, and is filled with oil. Oil port 15 in housing 2 connects with chamber 13, so that oil for car height adjustment can be fed into or delivered from chamber 13, through port 15. Cylinder housing 2 is formed with hole 16, through which air leaks from housing 2 when oil is injected therein. Hole 16 is closed by blind plug 17.

Coupling member 20 and bump rubber 21 are attached to the upper end portion of hollow rod 3, as is shown in FIG. 1. Dust cover 22 is situated between the outer end of rod 3 and cylinder housing 2. Cover 22 surrounds a sliding surface of rod 3 which protrudes from housing 2. Damping force-generating mechanism 24 is attached to the inner end of rod 3. It includes conventional plate valves 25 and 26.

Oil chamber 28 and gas chamber 29 are arranged in hollow rod 3. Chamber 28 communicates with oil chamber 13 of cylinder housing 2 by means of damping force-generating mechanism 24. An inert gas, such as nitrogen, as a preferred example, is sealed at high pressure in chamber 29.

Metal bellows 31, having sealed internal space 30, is housed in hollow rod 3. It divides oil chamber 28 and gas chamber 29. In other words, space 30 of bellows 31 serves as gas chamber 29. The gas is fed into chamber 29 through gas-supply port 33. Port 33 is closed by blind plug 34. A suitable quantity of liquid 35 is contained in bellows 31, whereby the capacity of chamber 29 is adjusted. Bellows 31 is coaxial with cylinder housing 2, and can extend or contract in the axial direction of housing 2 and rod 3.

Metal bellows 31 is formed of a thin plate of stainless steel, for example. The thickness of the plate is, for example, about 0.13 mm. Phosphor bronze, brass, aluminum, or any other suitable metal may be used in place of stainless steel. In this embodiment, bellows 31 is formed integrally from a cylindrical material, by plastic working. Alternatively, it may be formed by successively connecting a plurality of bellows elements, in the axial direction, by means of welding.

Figure 2:
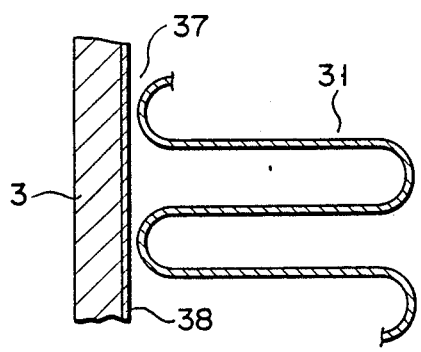
FIGS. 2 and 3 are sectional views showing modifications of part of a rod of the suspension system shown in FIG. 1.
Figure 3:
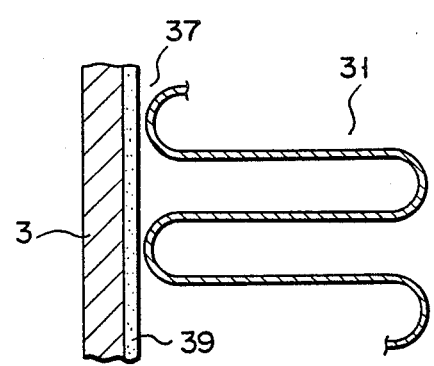

As in a preferred modification of rod 3, part of which is shown in FIG. 2, surface 37, in sliding contact with metal bellows 31, is coated with low-friction layer 38. Layer 38 is formed of resin (e.g., ethylene tetrafluoride, nylon, etc.) which has a low coefficient of friction, and cannot be easily worn away. By using layer 38, the frictional resistance between bellows 31 and surface 37 is reduced, whereby bellows 31 is prevented from being worn away. Moreover, the sliding motion of bellows 31 may be improved in smoothness by coating surface 37 with some low-friction material other than resins. Alternatively, as is shown in FIG. 3, sleeve 39, formed of sintered metal material impregnated with oil, may be provided on surface 37 opposite bellows 31. In a modification shown in FIG. 4, metal bellows 31 is coated with low-friction layer 38.

The operation of suspension system 1, constructed in this manner, will now be described.

If rod 3 moves in a direction such that it is pushed into cylinder housing 2, some of the oil in oil chamber 13 flows into oil chamber 28 of rod 3, via damping force-generating mechanism 24. As the oil flows through mechanism 24 in this manner, a damping force is produced by the viscous resistance of the oil. As a result, the motion of rod 3 is subjected to this resistance. At the same time, the gas in gas chamber 29 is compressed in accordance with the depth of depression of rod 3. Accordingly, metal bellows 31 contracts, thereby reducing the capacity of chamber 29, so that the repulsive force of the gas increases.

If rod 3 moves in a direction such that it extends out from cylinder housing 2, on the other hand, some of the oil in oil chamber 28 of rod 3 flows into oil chamber 13 of housing 2. Also in this case, the oil flows past damping force-generating mechanism 24, so that the motion of rod 3 is damped. In response to the movement of rod 3 in the extending direction, moreover, gas chamber 29 increases its capacity, so that metal bellows 31 extends.

Thus, as rod 3 repeatedly extends and contracts relative to cylinder housing 2, the suspension system serves both as a shock absorber and a gas spring. Moreover, the axial position or the length of projection of rod 3, relative to housing 2, can be changed by delivering the oil into or from oil chamber 13 through oil port 15. Thus, the ride height of the car can be changed.

In suspension system 1, oil chamber 28 and gas chamber 29 are completely isolated from each other by metal bellows 31, so that the gas in chamber 29 can be securely prevented from being absorbed into the oil in chamber 28. Without the need to replenish chamber 29 with gas, therefore, the spring characteristics and the ride comfort of the car, in the early stages of use, can be maintained for a long time. Also, the spring constant can be adjusted by controlling the quantity of liquid 35 in bellows 31, to change the capacity of gas chamber 29.

Figure 5:
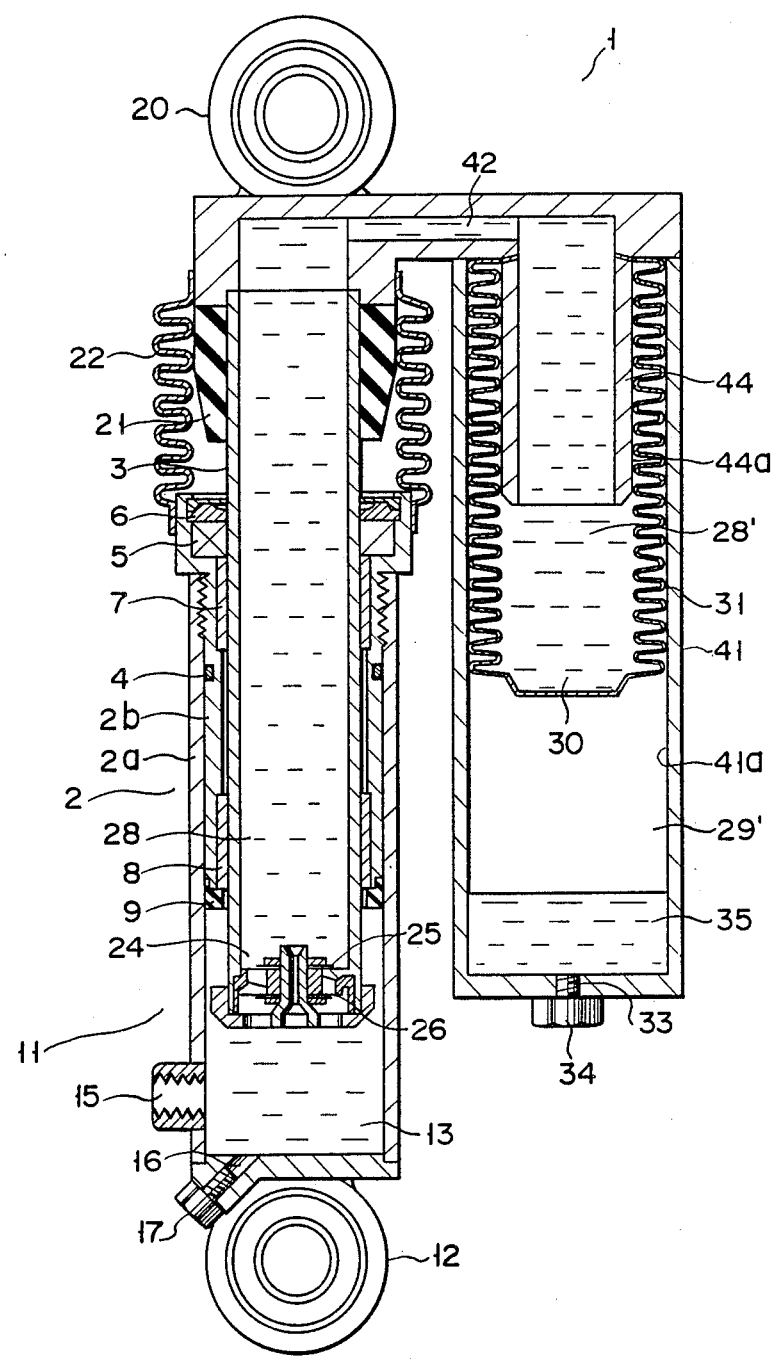
FIG. 5 is a longitudinal sectional view of a suspension system according to a second embodiment of the invention.

FIG. 5 shows a second embodiment of the present invention. Suspension system 1 of this embodiment comprises second cylinder housing 41, in addition to first cylinder housing 2 In the following description of the second embodiment, like reference numerals are used to designate like portions as in the first embodiment, for simplicity of illustration. Only differences between the two embodiments will now be described specifically.

Oil chamber 28' and gas chamber 29' are arranged in second cylinder housing 41. The two chambers are divided by metal bellows 31, which has sealed internal space 30. In the second embodiment, chambers 28' and 29' are defined inside and outside bellows 31, respectively. A suitable quantity of liquid 35 is contained in housing 41, whereby the capacity of gas chamber 29' is adjusted. Oil chamber 28' communicates with oil chamber 28 inside hollow rod 3, by means of passage 42.

Figure 4:
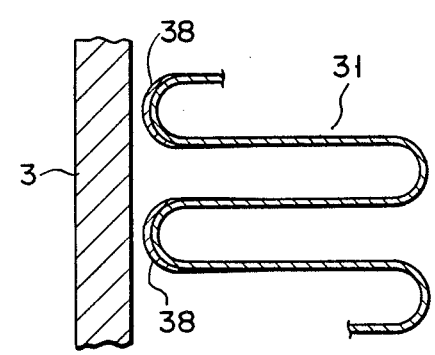
FIG. 4 is a sectional view showing a modification of part of a metal bellows of the suspension system shown in FIG. 1.

Inner cylinder 44 is provided inside second cylinder housing 41. Metal bellows 31 is located between cylinder 44 and housing 41, so as to be coaxial with housing 41. Bellows 31 can extend and contract in the axial direction of housing 41. Preferably, low-friction layer 38, as shown in FIG. 2, or oil-impregnated metal sleeve 39, as shown in FIG. 3, may be provided on inner peripheral surface 41a of housing 41 and/or outer peripheral surface 44a of cylinder 44. Alternatively, bellows 31 may be coated with low-friction layer 38, on either of its outer and inner peripheral surfaces, as is shown in FIG. 4.

When rod 3 reciprocates in the axial direction, relative to first cylinder housing 2, oil flows between oil chamber 13 inside housing 2 and oil chamber 28' inside second cylinder housing 41, via passage 42 and oil chamber 28 inside rod 3. Thus, the oil flows through damping force-generating mechanism 24, and a damping force is produced by the viscous resistance of the oil. As rod 3 extends and contracts, moreover, the capacity of gas chamber 29' varies, and metal bellows 31 extends and contracts. Also in this embodiment, oil and gas chambers 28' and 29' are divided completely from each other by bellows 31, so that gas in chamber 29' can be prevented from being absorbed into the oil in chamber 28'.

Figure 6:
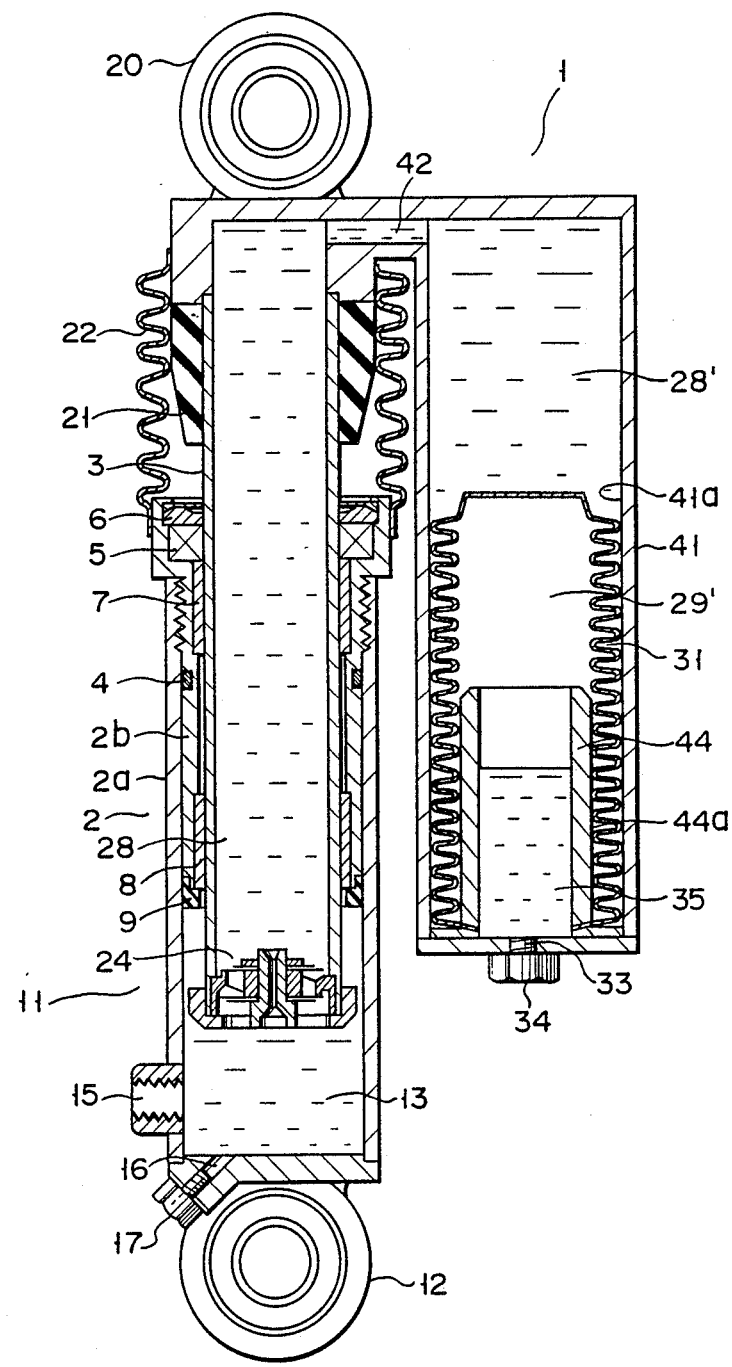
FIG. 6 is a longitudinal sectional view of a suspension system according to a third embodiment of the invention.

FIG. 6 shows a third embodiment of the present invention. In this embodiment, the relative positions of metal bellows 31 and inner cylinder 44 are opposite to those in the case of the second embodiment (FIG. 5). Gas chamber 29' and oil chamber 28' are defined inside and outside bellows 31, respectively. Since the second and third embodiments have no substantial differences, like reference numerals are used to designate like portions in the two embodiments, for simplicity of illustration.

Figure 7:
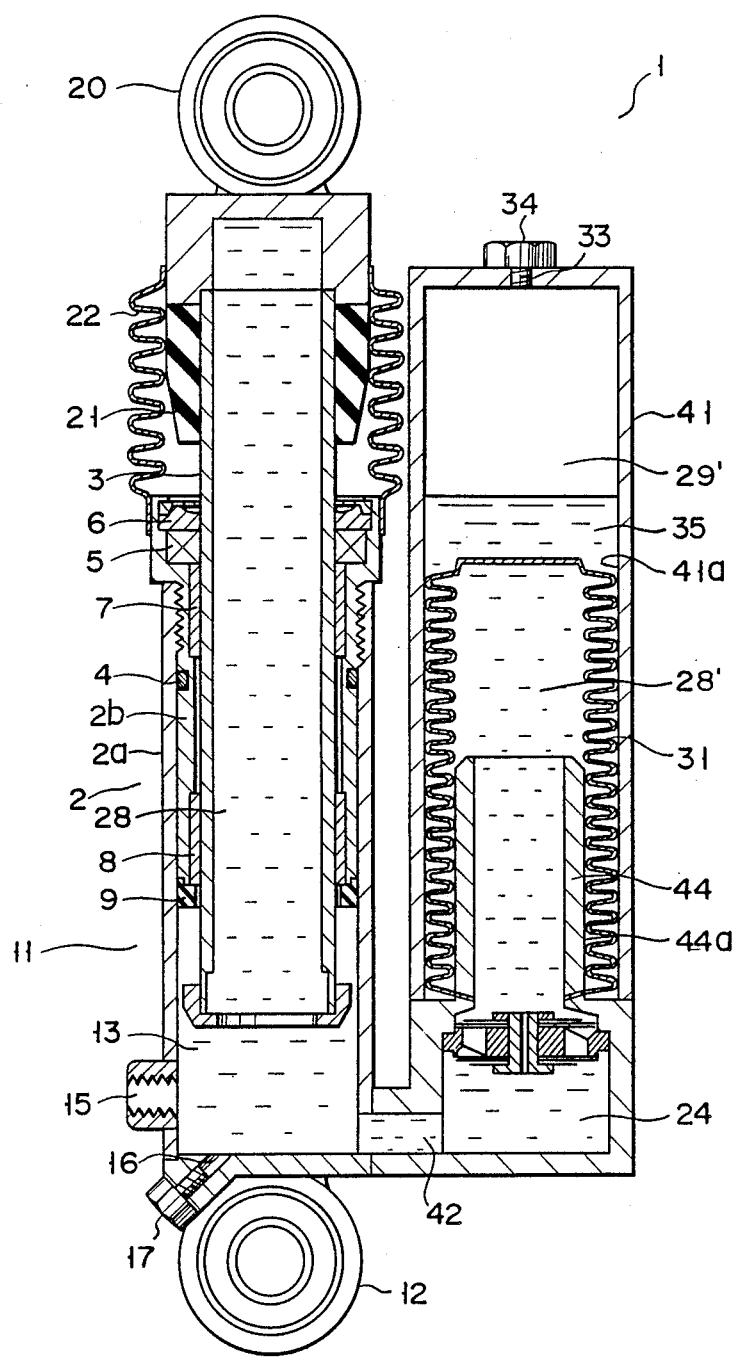
FIG. 7 is a longitudinal sectional view of a suspension system according to a fourth embodiment of the invention.

FIG. 7 shows a fourth embodiment of the present invention. In this embodiment, second cylinder housing 41 is inverted, as compared with the arrangement of the second embodiment. Damping force-generating mechanism 24 is provided inside housing 41. Passage 42 is located between oil chamber 13 in first cylinder housing 2 and oil chamber 28' in housing 41.

In the fourth embodiment constructed in this manner, when rod 3 moves in the axial direction, relative to first cylinder housing 2, oil flows between oil chambers 13 and 28', via damping force-generating mechanism 24. As the oil flows in this manner, the capacity of gas chamber 29' changes, so that metal bellows 31 extends and contracts. As regards other portions, the fourth embodiment has the same arrangement and functions as the second or third embodiment.

In the second, third, and fourth embodiments described above, passage 42 can be provided within one end portion of rod 3 or second housing 41. Alternatively, passage 42 can be made of a pipe connecting rod 3 and second housing 41. Furthermore, two or more housings 41 can be provided in each of the second, third, and fourth embodiments.

Figure 8:
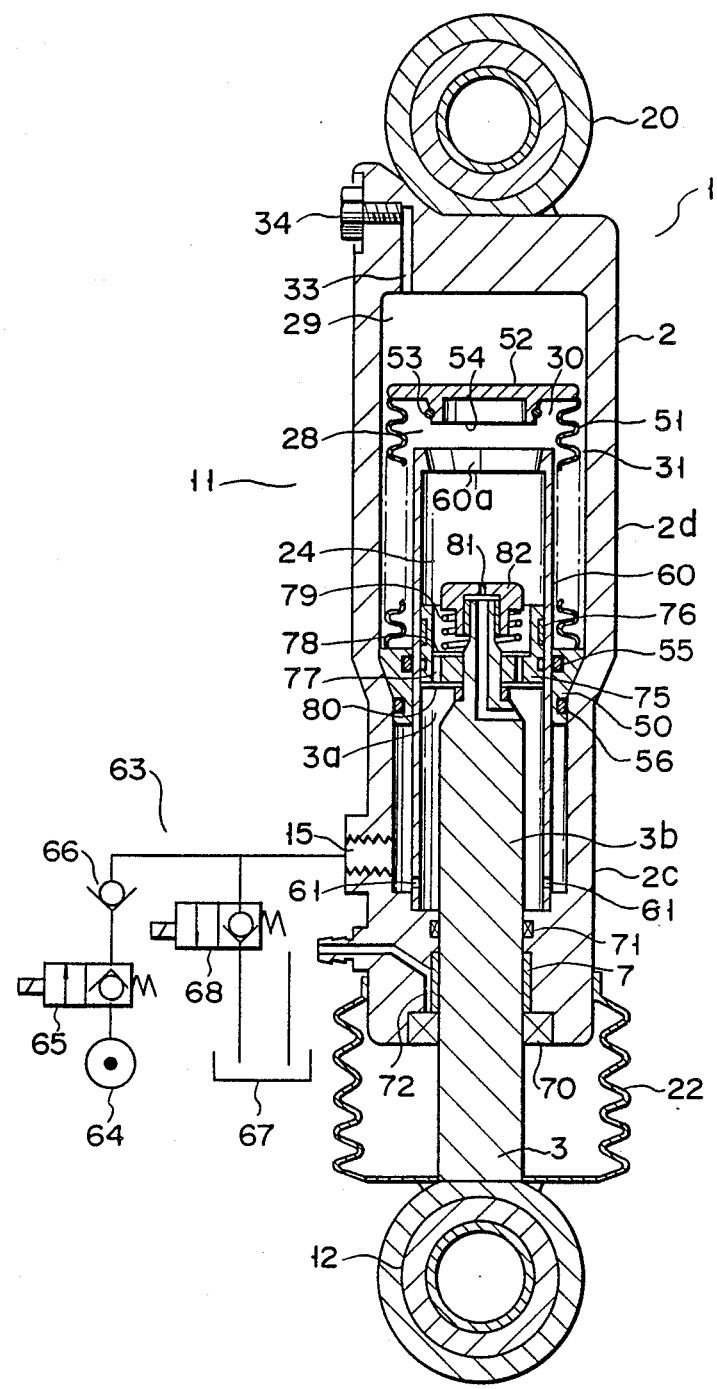
FIG. 8 is a longitudinal sectional view of a suspension system according to a fifth embodiment of the invention.

FIG. 8 shows a fifth embodiment of the present invention. In the description to follow, like reference numerals are used to designate like portions as in the first embodiment, for simplicity of illustration.

In the fifth embodiment, cylinder housing 2 includes shorter-diameter lower portion 2c and longer-diameter upper portion 2d. Metal bellows 31 is contained in portion 2d, so as to be coaxial with housing 2. The lower end of bellows 31 is fixed to housing 2 by means of bellows-fixing member 50. Bellows 31 can extend and contract in the axial direction of housing 2.

Metal bellows 31 includes bellows body 51, capable of extending and contracting in the axial direction of cylinder housing 2, and lid 52 fixed to an open end of body 51. The bellows body, like that of metal bellows 31 of the first embodiment, is formed of a thin metal plate. Since lid 52 is welded in a liquid-tight manner to the open end of body 51, sealed internal space 30 is defined inside bellows 31. Fitting portion 54, having seal 53 thereon, is formed on the inner surface of lid 52. The lower end of bellows body 51 is welded to bellows-fixing member 50. Member 50 is fixed to the boundary between shorter- and larger-diameter portions 2c and 2d of cylinder housing 2. Seals 55 and 56, such as O-rings, are provided on the inner and outer peripheral surfaces of member 50, respectively.

Oil chamber 28 and gas chamber 29 are defined inside cylinder housing 2. The two chambers are divided by metal bellows 31. Inner cylinder 60 is situated inside housing 2, so as to be substantially coaxial with housing 2 and bellows 31. The lower end of cylinder 60 is fixed to housing 2 by welding or the like. Cylinder 60 is formed with oil holes 61. Also, the inner cylinder is provided, at its upper end, with opening portion 60a of a size large enough to receive fitting portion 54 of lid 52. Opening portion 60a is adapted to engage seal 53 on fitting portion 54 when bellows body 51 is contracted to a predetermined degree or more.

Oil chamber 28 inside metal bellows 31 is filled with oil. It communicates with oil port 15 by means of the inside of inner cylinder 60, damping force-generating mechanism 24, and oil holes 61. Hydraulic unit 63 is connected to port 15. In this embodiment, unit 63 includes hydraulic source 64. Arranged between source 64 and port 15 are solenoid-operated valve 65 for lifting and check valve 66 for car-height maintenance. Solenoid-operated valve 68 for lowering is situated between oil tank 67 and port 15.

Gas is sealed, under high pressure, in gas chamber 29, which is defined between the outer surface of metal bellows 31 and the inner surface of cylinder housing 2. The gas is fed into chamber 29 through gas-supply port 33. If oil port 15 is connected to tank 67, when sealing the gas into chamber 29, bellows 31 is urged to contract to the limit by gas-sealing pressure, despite the presence of the oil in oil chamber 28. When bellows 31 has contracted to the predetermined degree or more, however, fitting portion 54 of lid 52 comes into close contact with opening portion 60a of inner cylinder 60. As a result, bellows 31 is prevented from contracting further. At the same time, the oil is confined to a gap between bellows body 51 and cylinder 60. Thus, even though the pressure of the gas, fed through port 33, is relatively high, body 51 can be prevented from being severely deformed. Accordingly, body 51 may be relatively low in mechanical strength, that is, it can be reduced in thickness.

In this embodiment, rod 3 is solid. It can reciprocate in the axial direction, relative to cylinder housing 2. Sliding bearing 7 is provided between the sliding surfaces of housing 2 and rod 3. Low- and high-pressure seals 70 and 71 are arranged close to bearing 7. Drain pipe 72 is connected between seals 70 and 71. Communicating with tank 67, pipe 72 allows the oil to leak out from seal 71. Therefore, seal 71 requires only a small clamping force, so that the sliding resistance of rod 3 on cylinder housing 2 is lowered.

Distal end portion 3a of rod 3, which is piston-shaped, penetrates into metal bellows 31. Damping force-generating mechanism 24 is attached to portion 3a. In this embodiment, mechanism 24 has disk-shaped valve body 75 mounted on the tip end of body portion 3b of rod 3. Sliding bearing 76 is fitted on the outer peripheral surface of body 75, in sliding contact with inner cylinder 60. Thus, rod 3 is supported stably by two sliding bearings 7 and 76 which are spaced in its axial direction.

Disc-shaped valve body 75 has oil passage 77 extending in its axial direction. Relief plate 78 is provided at one end side of passage 77, and opens when rod 3 moves in its extending direction. Normally, plate 78 is urged in a closing direction by coil spring 79. Relief plate 80 is provided at the other end side of passage 77, and opens when rod 3 moves in its contracting direction. Further, member 82 with constant orifice 81 is fixed to the tip end of rod body 3b.

The operation of the fifth embodiment with the above construction will now be described.

If rod 3 moves in its extending direction, relative to cylinder housing 2, oil inside inner cylinder 60 passes through damping force-generating mechanism 24, thereby producing a damping force. At the same time, the capacity of gas chamber 29 increases by a volume corresponding to the length of extension of rod 3, and bellows body 51 contracts correspondingly.

If rod 3 moves in its contracting direction, on the other hand, the oil flows through damping force-generating mechanism 24, thereby producing a damping force. Also, gas chamber 29 is compressed by a volume corresponding to the depth of depression of rod 3, and bellows body 51 extends correspondingly. Thus, the gas in chamber 29 is compressed, thereby increasing its repulsive force.

The oil can be delivered into or from cylinder housing 2 by operating solenoid-operated valve 65 or 68 of hydraulic unit 63. By changing the quantity of oil in housing 2, in this manner, the length of extension of rod 3 relative to housing 2, that is, the ride height of the car, can be adjusted.

According to the fifth embodiment, as described above inner cylinder 60 and distal end portion 3a of rod 3 penetrate metal bellows 31. If end portion 3a of rod 3 moves toward lid 52 or in the contracting direction, bellows 31 extends so as to move away from portion 3a. In other words, internal space 30 of bellows 31 serves not only to contain the oil, but also to receive rod 3 effectively. Even though bellows 31 is contained in cylinder housing 2, therefore, the overall length of cylinder assembly 11 can be relatively short.

Further, distal end portion 3a of rod 3 is supported by sliding bearing 76, and the middle portion of rod 3, with respect to its axial direction, is also supported by sliding bearing 7. Since the distance between bearings 7 and 76 can be made long enough, the axial reciprocation of rod 3 is stable, and the sliding resistance is relatively small. Hydraulic unit 63 and drain pipe 72 may be omitted.

Instead of being fixed to cylinder housing 2, moreover, inner cylinder 60 may be formed integrally with rod 3. In this case, cylinder 60 is slidably supported with the use of a sliding bearing attached to bellows fixing member 50 Alternatively, a sliding bearing (not shown) may be attached to member 50 so as to support rod 3, without the use of cylinder 60.

In contrast with the arrangement of the fifth embodiment, furthermore, the system may be inverted so that coupling members 12 and 20 of rod 3 and cylinder housing 2 are connected to the car-body side and wheel side, respectively. Alternatively, an actuator, such as a pulse motor, may be contained in rod 3 so that the opening area of the orifice of damping force-generating mechanism 24 is controlled by means of the actuator. With this arrangement, the damping force can be changed in accordance with the road surface conditions or running conditions.

What is claimed is:

1. A hydro-pneumatic suspension system used in a vehicle, comprising:
    a cylindrical, hollow main housing having a first end and a second end, an interior of said main housing defining a first oil chamber filled with oil;
    a rod inserted into the interior of said main housing through the first end, said rod being movable within a predetermined stroke in an axial direction of said main housing and having an inner end portion located inside of said main housing, and an outer end portion located outside of said main housing;
    a cylindrical, hollow sub housing having a closed first end portion and a second end portion;
    connecting means for connecting the first oil chamber of said main housing and the second end portion of said sub housing together, said connecting means having an oil passage;
    a metal bellows received within said sub housing and arranged coaxial therewith, said bellows having a fixed end fixed to the second end portion of said sub housing in a liquid tight manner and a closed free end, said bellows having an outer diameter smaller than an inner diameter of said sub housing, said bellows being expansible and contractible in an axial direction of said sub housing;
    a second oil chamber defined by an inner wall of said metal bellows, said second oil chamber communicating with the first oil chamber of said main housing through the oil passage of said connecting means;
    damping force-generating means disposed within said sub housing and including an orifice permitting the oil in said main and sub housings to pass therethrough, said damping force-generating means being adapted to damp reciprocation of said rod by utilizing viscous resistance of the oil when said rod moves in the axial direction of said main housing;
    a gas chamber defined by both an outer wall of said bellows and an inner wall of said sub housing, said gas chamber containing a high-pressure compressed inert gas which is sealed therein for providing a repulsive force, the repulsive force acting in such a way as to withstand a load applied in a direction in which said rod is pushed into said main housing, said gas chamber having an internal volume large enough to absorb a variation in the degree of insertion of said rod into said main housing when said rod moves within the predetermined stroke; and
    a predetermined amount of gas spring constant-adjusting liquid contained in said gas chamber, an effective internal volume of said gas chamber being adjusted in accordance with the amount of the liquid, and an upper surface of the liquid is opposite to the closed free end of said metal bellows.

2. The hydro-pneumatic suspension system according to claim 1, wherein said bellows is formed of a thin single-layer metal plate.

3. The hydro-pneumatic suspension system according to claim 1, wherein said first end of said cylindrical main housing is open, and said second end thereof is closed.

4. The hydro-pneumatic suspension system used in a vehicle, comprising:
    a cylindrical, hollow main housing having a first end and a second end, an interior of said main housing defining a first oil chamber filled with oil;
    a rod inserted into the interior of said main housing through the first end, said rod being movable in an axial direction of said main housing and having an inner end portion located inside of said main housing, and an outer end portion located outside of said main housing;

a cylindrical, hollow sub housing non-coaxially positioned adjacent to said main housing and having a closed first end portion and a second end portion;

connecting means for connecting the first oil chamber of said main housing rod and the second end portion of said sub housing together, said connecting means having an oil passage and being connected at one end to said first end of said main housing and at the opposite end to said second end portion of said sub housing;

a metal bellows received within said sub housing and arranged coaxial therewith, said bellows having a fixed end fixed to the second end portion of said sub housing in a liquid tight manner and a closed free end, said bellows having an outer diameter smaller than an inner diameter of said sub housing, said bellows being expansible and contractible in an axial direction of said sub housing;

a second oil chamber defined by an inner wall of said metal bellows, said second oil chamber communicating with the first oil chamber of said main housing through the oil passage of said connecting means;

damping force-generating means disposed within said sub housing and including an orifice permitting the oil in said main and sub housings to pass therethrough, said damping force-generating means adapted to damp reciprocation of said rod by utilizing viscous resistance of the oil when said rod moves in the axial direction of said main housing; and a gas chamber defined by both an outer wall of said bellows and an inner wall of said sub housing, said gas chamber containing a high-pressure compressed gas which is sealed therein for providing a spring force.

5. A hydro-pneumatic suspension system according to claim 4, wherein said bellows is formed of a thin single-layer metal plate.

6. A hydro-pneumatic suspension system according to claim 4, further including a predetermined amount of gas spring constant-adjusting liquid contained in said gas chamber, such that an upper surface of said gas spring constant-adjusting liquid is opposite to said closed free end of said bellows.

7. A hydro-pneumatic suspension system according to claim 6, further including port means for adjusting the level of said gas spring constant-adjusting liquid contained in said gas chamber.

8. The hydro-pneumatic suspension system according to claim 4, wherein said first end of said cylindrical main housing is open, and said second end thereof is closed.

* * * * *